United States Patent
Serebrin et al.

(10) Patent No.: US 8,793,471 B2
(45) Date of Patent: Jul. 29, 2014

(54) ATOMIC PROGRAM VERIFICATION

(75) Inventors: Benjamin C. Serebrin, Sunnyvale, CA (US); Stephen D. Glaser, San Francisco, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 408 days.

(21) Appl. No.: 12/961,844

(22) Filed: Dec. 7, 2010

(65) Prior Publication Data
US 2012/0144128 A1 Jun. 7, 2012

(51) Int. Cl.
  G06F 9/44 (2006.01)
  G06F 12/08 (2006.01)
  G06F 12/14 (2006.01)

(52) U.S. Cl.
  USPC ............................ 712/216; 710/200; 711/118

(58) Field of Classification Search
  None
  See application file for complete search history.

(56) References Cited

U.S. PATENT DOCUMENTS

| | | | |
|---|---|---|---|
| 4,847,754 A | 7/1989 | Obermarck et al. | |
| 5,175,829 A | 12/1992 | Stumpf et al. | |
| 5,218,712 A | 6/1993 | Cutler et al. | |
| 5,428,761 A | 6/1995 | Herlihy et al. | |
| 5,701,501 A | 12/1997 | Gandhi | |
| 6,170,038 B1 * | 1/2001 | Krick et al. | 711/125 |
| 6,370,625 B1 | 4/2002 | Carmean et al. | |
| 6,430,657 B1 | 8/2002 | Mittal et al. | |
| 7,103,528 B2 | 9/2006 | Motyka et al. | |
| 8,392,661 B1 * | 3/2013 | Metcalf | 711/133 |
| 2002/0087810 A1 | 7/2002 | Boatright et al. | |
| 2003/0037223 A1 | 2/2003 | Steely et al. | |
| 2004/0162968 A1 | 8/2004 | Tremblay et al. | |
| 2007/0050560 A1 | 3/2007 | Alsup | |
| 2007/0067529 A1 * | 3/2007 | Alsup | 710/200 |
| 2007/0067573 A1 * | 3/2007 | Bruening et al. | 711/125 |
| 2007/0186056 A1 | 8/2007 | Saha et al. | |
| 2009/0019209 A1 | 1/2009 | Shen et al. | |
| 2010/0332801 A1 | 12/2010 | Fryman et al. | |
| 2010/0332807 A1 | 12/2010 | Sheaffer et al. | |
| 2011/0078385 A1 * | 3/2011 | Lev et al. | 711/147 |
| 2011/0296148 A1 | 12/2011 | Cain et al. | |

OTHER PUBLICATIONS

Melvin et al., "Hardware Support for Large Atomic Units in Dynamically Scheduled Machines", TH0236-0/88/000/0060, 1988.*
International Search Report and Written Opinion in Application No. PCT/US2011/063772 dated Mar. 22, 2012, 13 pages.
Janice M. Stone, et al., "Multiple Reservations and the Oklahoma Update," IEEE Parallel and Distributed Technology, Nov. 1993, XP002286236, pp. 58-71.
Shen et al., "Modern Processor Design: Fundamentals of Superscalar Processors," McGraw-Hill, 2002, 8 pages.

* cited by examiner

*Primary Examiner* — Gary Portka
(74) *Attorney, Agent, or Firm* — Meyertons, Hood, Kivlin, Kowert & Goetzel, P.C.; Michael B. Davis

(57) ABSTRACT

An apparatus for executing an atomic memory transaction comprises a processing core in a multi-processing core system, where the processing core is configured to store an atomic program in a cache line. The apparatus further comprises an atomic program execution unit that is configured to execute the atomic program as a single atomic memory transaction with a guarantee of forward progress.

20 Claims, 8 Drawing Sheets

ATOMIC PROGRAM VERIFICATION

BACKGROUND

Modern trends in computer architecture have seen a move toward multi-processing, where a single system and/or processor includes multiple processing cores that share memory and are each capable of independent concurrent execution. It is now relatively common to see chip multi-processors (CMPs) with 2, 4, or 8 processing cores on a single chip, or general-purpose graphics processing units (GPGPUs) with many more processing cores. Additionally, the number of processing cores on each chip and/or system is likely to increase even further in the future.

To utilize the increased parallelism capabilities of modern processors, software programmers utilize various synchronization facilities such as ISA-supported atomic instructions. A processing core can execute such instructions atomically with respect to other processing cores in the system, even though the instruction itself contains multiple microinstructions. For example, the atomic instruction CMPXCHG (compare & exchange) in x86 architectures is a general-purpose atomic instruction that instructs a processing core to atomically compare the contents of a given memory location to a given value and, only if the two values are the same, modify the contents of that memory location to a given new value.

ISAs sometimes provide a limited number of specific-purpose atomic instructions, such as atomic XADD, BTS, etc. Where no specific-purpose instructions exist for particular functionality desired by a programmer, the programmer may attempt to construct such logic using general-purpose instructions such as CMPXCHG. However, such constructions can be complex, difficult to implement, and slow to execute.

SUMMARY OF EMBODIMENTS

An apparatus for executing an atomic memory transaction comprises a processing core in a multi-processing core system, where the processing core is configured to store an atomic program in a cache line. The apparatus further comprises an atomic program execution unit that is configured to execute the atomic program as a single atomic memory transaction with a guarantee of forward progress.

In some embodiments, the execution unit is able to execute the atomic program with a guarantee of forward progress, at least in part because the atomic program meets a set of one or more atomicity criteria, including that executing the atomic program does not require accessing memory other than the cache line. In some embodiments, the programming language in which the program is encoded may implicitly guarantee that all programs expressible by the programming language meet the atomicity criteria. In some embodiments, the programming language may be a stack based language that the atomic execution unit may be able to execute in place, within the cache line.

DETAILED DESCRIPTION OF EMBODIMENTS

Figure 1:
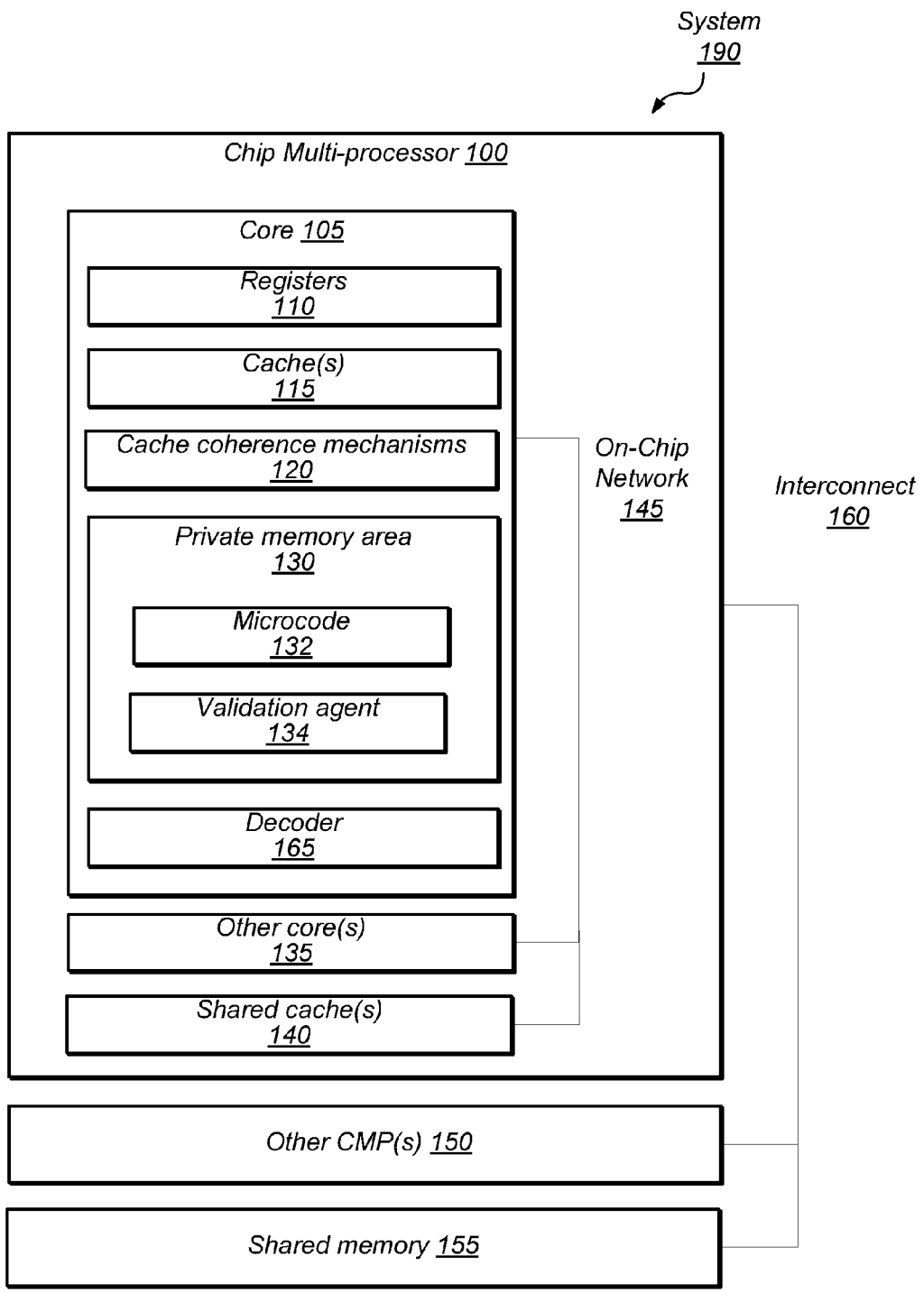
FIG. 1 is a block diagram illustrating a computer system configured to validate and execute atomic instruction sequences with guarantees of forward progress, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. Configured to may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

Based on As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

General-purpose atomic instructions, such as CMPXCHG, can be used to construct arbitrary logic for accessing single memory locations (e.g., single cache lines) atomically. As used herein, the term atomically refers to execution whose intermediate results are not observable by other threads of program execution. Therefore, instructions in an atomically executed sequence (i.e., an atomic sequence) appear to all other threads as having been executed as a single atomic operation.

The approach of constructing atomic logic using general-purpose atomic instructions has several shortcomings. First, implementing various functions using these general-purpose instructions often requires rather complex lock-free algorithms or software semaphores. Furthermore, because CMPXCHG operations can be aborted in the presence of contention, algorithms utilizing these operations cannot guarantee forward progress and require software contention management mechanisms to arbitrate between concurrent threads of execution. This leads to performance loss since the user program or guest OS utilizing CMPXCHG cannot be guaranteed that it will proceed through an algorithm with no possibility of interrupt or page fault. Furthermore, CMPXCHG operations are themselves somewhat inefficient to execute, requiring at least two accesses to the target cache line for the one operation.

Programmers often require single-line atomic transactions that are not simple to perform with the limited set of fixed-function atomic operations and/or would suffer performance degradation if built using these atomic instructions. For example, some multi-core task management techniques require atomic transactions to two or more data values that may be in the same cache line.

Recently, hardware-transactional memory systems (HTM) have been proposed as a means for allowing programmers to execute custom sequences of instructions atomically. However, such systems require complex hardware support and are still subject to livelock situations, such as aborted transaction attempts. Therefore, such systems remain subject to performance degradation in the presence of contention and require contention management mechanisms to avoid deadlock and/or livelock.

As used herein, the term deadlock refers to a situation in which a given thread of execution stalls indefinitely due to contention with another thread (e.g., each of two threads concurrently waits for the other to release a respective lock). As used herein, the term livelock refers to a situation in which a thread of execution repeatedly attempts to execute the same instruction sequence and fails (at least once) due to contention with another thread (e.g., an HTM system repeatedly attempts and aborts execution of a transactional region due to memory contention). While a given thread is deadlocked or livelocked, it cannot make forward progress (i.e., execute and move beyond the instruction sequence).

According to various embodiments, a computer system may be configured to provide facilities allowing a programmer to designate a custom sequence of instructions as an atomic sequence that the system can execute as a single atomic transaction that is guaranteed to make forward progress. As used herein, a guarantee of forward progress means that execution of the atomic instruction sequence will not be subject to deadlock or livelock, as defined above.

In some embodiments, the system may include a validation agent configured to verify whether a sequence that has been designated as atomic conforms to specific atomicity criteria. In such embodiments, meeting the atomicity criteria ensures that the system can execute the sequence atomically with a guarantee of forward progress. In various embodiments discussed in more detail below, the validation agent may be placed in a processor, in a memory subsystem, or elsewhere in the system.

FIG. 1 is a block diagram illustrating a computer system configured to validate and execute atomic instruction sequences with guarantees of forward progress, according to some embodiments.

According to the illustrated embodiment, system 190 comprises chip multi-processor (CMP) 100, which is connected via interconnect 160 to various other CMPs 150 and to shared memory 155. In some embodiments, shared memory 155 may be arranged in a memory hierarchy—for example, one comprising an L3 cache and main memory.

Although FIG. 1 illustrates an embodiment with multiple interconnected CMPs, the systems and techniques described herein may be applied generally to other systems with multiple processing cores regardless of how they are distributed in the system. For example, in some embodiments, CMP 100 and/or any of other CMPs 150 may be replaced with regular single-core processors. In other embodiments, CMP 100 may comprise multiple cores and the system may comprise no other CMPs (e.g., 150), processors, or processing cores.

In the illustrated embodiment, CMP 100 comprises multiple processing cores (i.e., 105, 135) connected by and configured for communication over on-chip network 145. On-chip network 145 may correspond to any of various types of point-to-point networks arranged according to different network topologies (e.g., 2D or 3D grid, Torus, linear, ring, etc.). In other embodiments, cores 105 and 135 may be connected via a bus and/or another type of interconnect.

In some embodiments, an on-chip interconnect (e.g., on-chip network 145) may connect cores on a CMP (e.g., cores 105 and 135 on CMP 100) to one or more shared data caches, such as data caches 140 (e.g., L2) cache. In some embodiments, a core may also include one or more private data caches, such as cache(s) 115 of core 105, which the core may use to store data cached from the shared memory 155.

In order to maintain coherency of cached data, each core may also include various cache coherence mechanisms, such as 120. Cache coherence mechanisms 120 may include facilities to exchange cache coherence messages with other processing cores (e.g., MESI protocol messages) and/or to perform synchronization functions (e.g., marking cache lines in cache 115 as exclusively owned, rejecting, accepting, and/or answering cache coherence probes from other processing cores, etc.).

According to the illustrated embodiment, core 105 may also include various registers 110 usable for temporarily storing data, such as instruction or stack pointers, intermediate results, or other data. Registers 110 may include various special-purpose and/or general-purpose registers.

In the illustrated embodiment, core 105 includes private memory area 130, which may comprise a protected, fast memory area for storing private data, such as microcode 132. Microcode 132 may include microinstructions executable by processing core 105 to implement different program instructions (e.g., CMPXCHG) and/or arbitrary microprograms. In some embodiments, microcode 132 may include microprograms and/or atomic microprograms that have been verified by a validation agent (e.g., 134) to meet certain atomicity criteria, as described below.

In the particular embodiment of FIG. 1, private memory area 130 includes microcode to implement microcoded validation agent 134, which is configured to receive an indication of a sequence of instructions, validate whether they are an atomic sequence that meets given atomicity criteria, store a copy of the sequence in private memory area 130, and/or return a handle identifying the stored copy of the sequence to other program code. This method is described in more detail in the description of FIG. 3.

In other embodiments, validation agent 134 need not necessarily be microcoded and stored in memory area 130. For example, in some embodiments, validation agent 134 may be implemented by hardware logic built into a hardware unit of core 105, such as instruction decoder 165. In yet other embodiments, validation agent 134 may be implemented separately from core 105 altogether, such as by a special-purpose processor in the memory subsystem, as described below.

Figure 2:
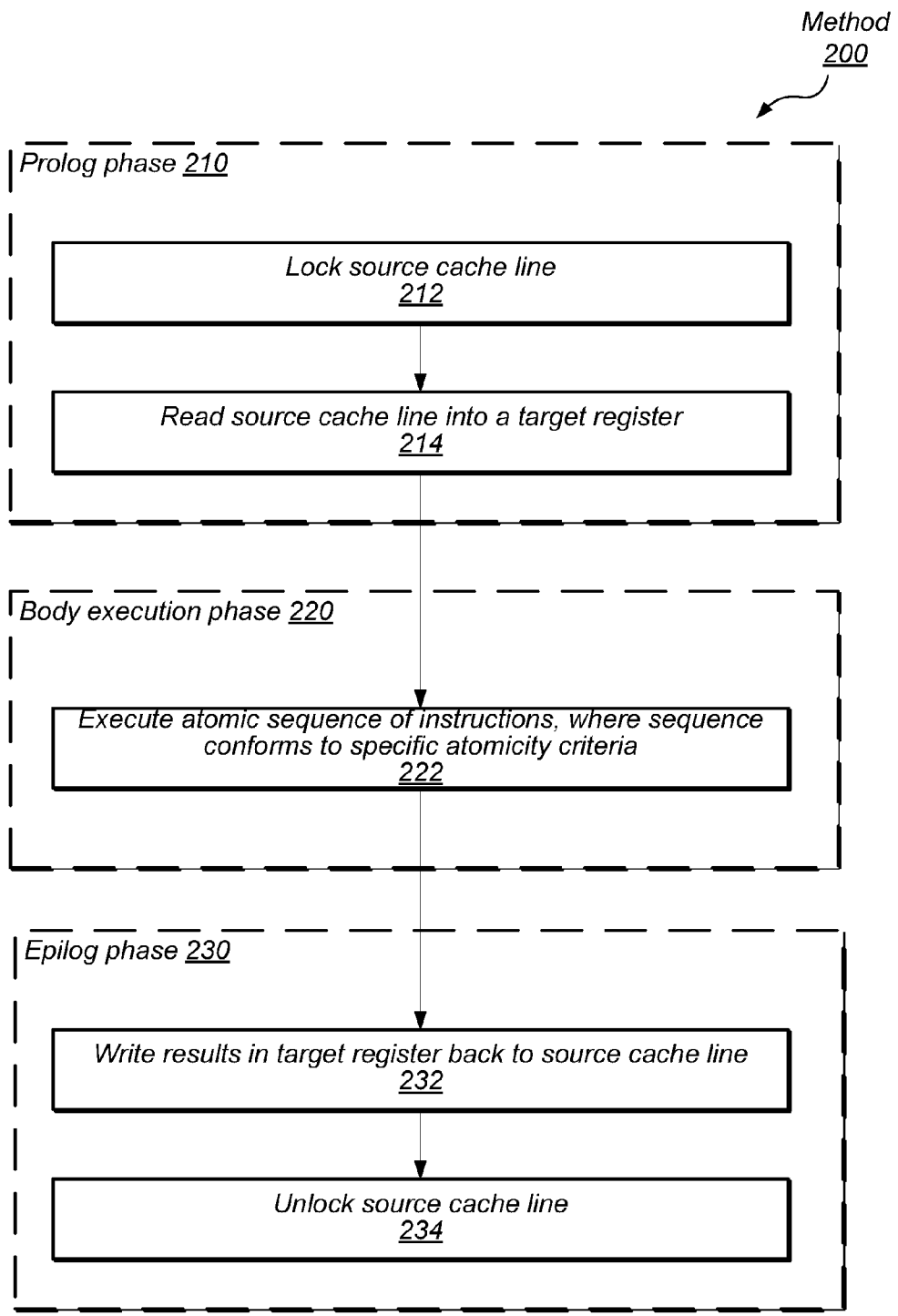
FIG. 2 is a flow diagram illustrating a method for executing a custom sequence of microinstructions atomically, where the instruction sequence conforms to given atomicity criteria, according to some embodiments.

FIG. 2 is a flow diagram illustrating a method for executing a custom sequence of microinstructions atomically, where the instruction sequence conforms to given atomicity criteria, according to some embodiments. Method 200 may be executed by a processing core, such as processing core 105 of FIG. 1, as part of executing an atomic instruction sequence with a guarantee of forward progress.

As shown in FIG. 2, method 200 includes three phases: a prolog phase 210 (in which any data to be used in the transaction may be read), a body execution phase 220 (in which the instructions are executed), and an epilog phase 230 (in which any results are written back to memory). During the prolog phase, the processing core locks a given source cache line, as in 212. As used herein, a processing core that locks a cache line has exclusive read/write privileges to the cache line such that no other processing core may read the cache line contents or cause them to be modified until the core holding the lock releases it. The particular step(s) necessary to ensure this property will vary between implementations and depend on other system details, such as the particular cache coherence mechanisms and protocols employed. For example, in some embodiments, a core that locks a given cache line may refuse probes or other cache coherence messages that it receives from another processor when those messages concern a locked cache line. In some embodiments, the core may also delay handling various hardware interrupts and/or software signals that the core receives until after executing the atomic sequence and unlocking the cache line. By performing such steps, a core may read and/or modify the contents of the cache line without interruption.

After locking the cache line, as in 212, the processor may read data from the source cache line, as in 214. Reading the source cache line in 214 may include storing the data from the cache line in one or more target registers for subsequent access by one or more instructions of the sequence. In some instances, the processor may read less than the entire source cache line into the target registers. For example, the processor may read only one portion of the source cache line (e.g., 64-bytes) into a single target register or may read a number of (or all) portions of the source cache line, each into a respective target register.

As shown in FIG. 2, once the prolog phase is complete, execution may proceed to the body execution phase 220 where the core executes the atomic sequence of instructions as a single atomic transaction, such as in 222. Various ones of these instructions may read data from and/or write data to the target register(s).

As indicated in 222, the atomic sequence of instructions conforms to specific atomicity criteria that enable the core to execute the sequence as a single atomic transaction. In some embodiments, atomicity criteria may be chosen to ensure that the sequence is quick and simple to execute and can be guaranteed forward progress by the executing core. Such criteria may include conditions that no instruction in the sequence accesses memory or jumps to sections of code outside the atomic sequence. In some embodiments, atomicity criteria may include conditions on the entire sequence, such as an instruction count limit or time limit on executing the sequence. Atomicity criteria are discussed in more detail below.

When all the instructions in the atomic sequence have been executed, the process enters epilog phase 230. In epilog phase 230, the processing core may write results of the execution back to the locked cache line 232. For example, the core may write the data in the target register to the source cache line. Once this is done, the executing core may release the source cache line, as in 234.

Before executing the sequence of instructions, the system may first determine that the sequence is in fact an atomic sequence that conforms to the specific atomicity criteria. In different embodiments, this determination may be done at different times and/or by different components of the system. For example, in some embodiments, the sequence may be validated as it is being executed, such as by a hardware-implemented validation agent within the instruction execution pipeline (e.g., in decoder 165). In other embodiments, the sequence may be validated statically before being executed, such as by a microcoded validation agent invoked before the instruction sequence is executed. In yet other embodiments, the sequence may be validated and/or executed by a special-purpose, off-chip processor configured to execute atomic instruction sequences on behalf of other processing cores. Although other possibilities exist, these three configurations are further elaborated upon below.

Figure 3:
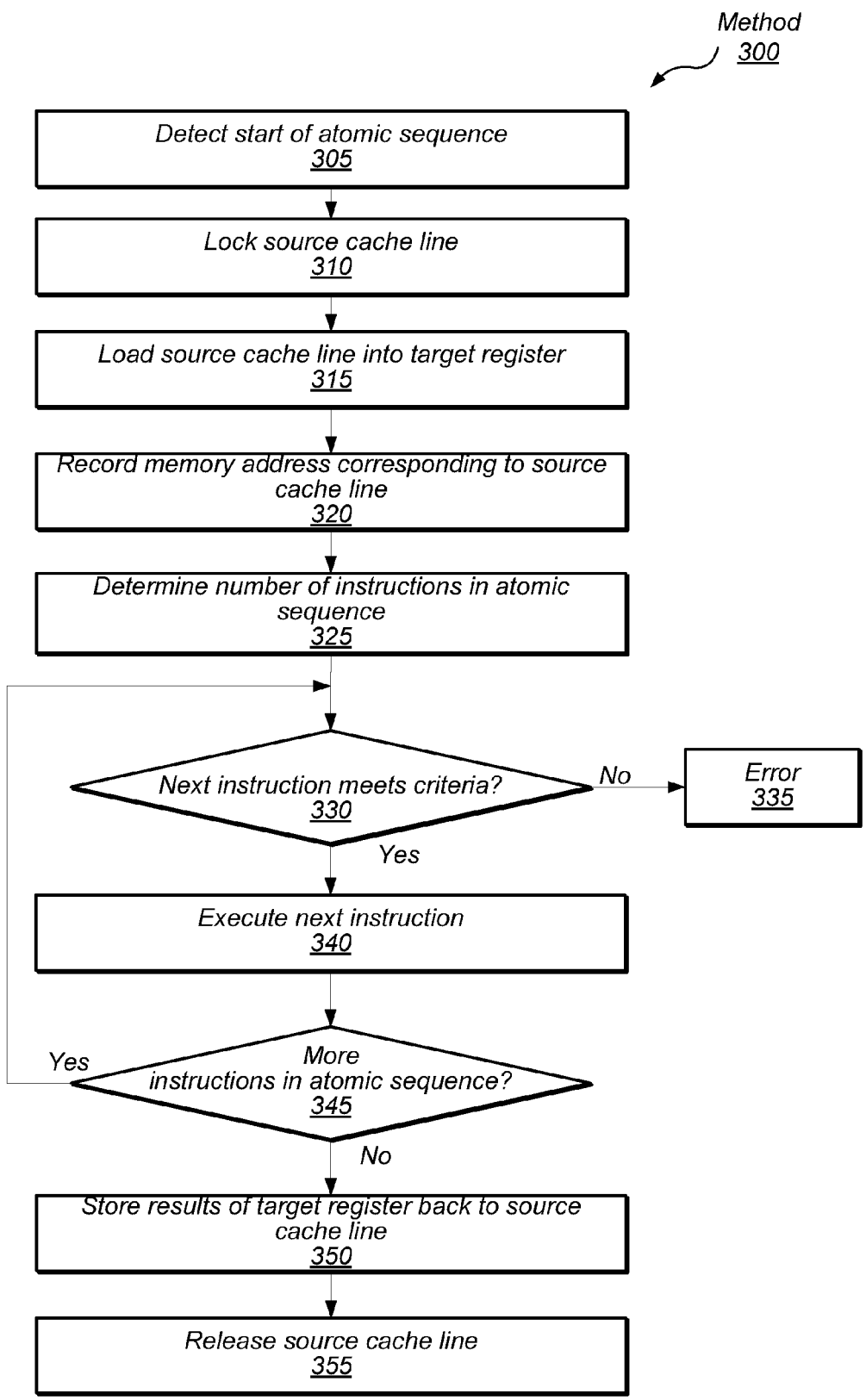
FIG. 3 is a flow diagram illustrating a method of a processing core validating and executing an atomic sequence of instructions using a runtime validation unit in the instruction execution pipeline, according to some embodiments.

FIG. 3 is a flow diagram illustrating a method of a processing core validating and executing an atomic sequence of instructions using a runtime validation unit in the instruction execution pipeline (e.g., in the decoder), according to some embodiments. Some processing cores may be configured to execute program instructions using a multi-stage instruction pipeline, which may include stages such as instruction fetch, instruction decode, instruction execute, memory access, register write back, etc. In some embodiments, a processing core's instruction pipeline may include a validate stage in which the processing core verifies whether an instruction in an atomic sequence meets a set of one or more atomicity criteria. The validation stage may be implemented as a separate stage or as part of a pre-existing stage (e.g., the decode stage) that is performed before an execution stage of the pipeline. An execution stage refers to a pipeline stage in which the processing core computes a result of the instruction. Whether the instruction reaches the execution stage may depend on the processing core successfully validating, in the validation stage, that the instruction meets the atomicity criteria.

In some such embodiments, a decoder (e.g., 165 in FIG. 1) may include a validation unit configured to validate each instruction in the sequence during the decode stage. In response to discovering that the sequence (and/or any instruction in the sequence) does not conform to the atomicity criteria, such a validation agent may halt execution, raise an exception, and/or otherwise indicate an error and unlock the source cache line.

FIG. 3 illustrates an example of one method by which a validation agent in such an embodiment may operate. In different embodiments, method 300 of FIG. 3 may be executed by the decoder, by a validation unit implemented as part of the decoder, and/or by another hardware component of a processor or processing core.

As shown in 305, method 300 is initiated in response to the system detecting the start of a sequence of program instructions designated for atomic execution. For example, in some embodiments, the sequence may be demarcated in program code using "START" and "STOP" program instructions respectively denoting the start and end of the sequence.

In response to reading a START instruction, as in 305, the core may perform one or more steps corresponding to the prolog of FIG. 2. These steps may include reading a source cache line (as in 212) and locking the cache line (as in 214).

In some embodiments, the source cache line and/or target register may be indicated by the START instruction (e.g., in one or more fields or parameters). For example, in embodiments utilizing an x86-compatible architecture, a START instruction may include the memory address of the source cache line in one field of the START instruction (e.g., modrm.r/m field) and an indication of the target register in another field (e.g., modrm.reg field). In response to reading these values, the core may lock the identified source cache line (as in 310) and load data from that indicated source cache line into the identified target register (as in 315) for subsequent access by one or more of the instructions in the sequence.

In some embodiments, executing the START instruction may further comprise recording the memory address of the data in the source cache line (as in 320) and/or the number of instructions in the atomic sequence (as in 325). In some embodiments, the number of instructions in the atomic region may be indicated by a value stored in another field of the START instruction, such as the xop.vvvv field.

After completing steps 305-325 (which may correspond to the prolog phase of execution), the core may execute the body of the transaction, as illustrated by steps 330-345. During this phase, the core proceeds through the code sequence and if the next instruction in the sequence meets the atomicity criteria (as indicated by the affirmative exit from 330), the core executes that instruction (as in 340). If the next instruction does not meet the atomicity criteria (as indicated by the negative exit from 330), the system may raise an exception, halt execution of the sequence, jump to error handling code, and/or otherwise indicate that the sequence does not meet the atomicity criteria, as in 335.

In some embodiments, the atomicity criteria may be chosen to ensure that the sequence is quick and simple to execute and can be guaranteed forward progress by the executing core. For example, in some embodiments, the criteria may include the criterion that no instruction in the sequence may access memory. In some embodiments, the criteria may also include the criterion that no instruction in the sequence may access (read and/or write) a register that is not a general-purpose register (GPR). Since instructions that meet these criteria cannot themselves cause a data conflict with another thread of execution, an instruction sequence composed of only such operations may not be subject to deadlock or livelock, and may therefore be guaranteed to make forward progress when executed. In various embodiments, the atomicity criteria may include various other or additional conditions (e.g. no jump instructions, no immediate forms of instructions, etc.) In addition to criteria that relate to the type of instructions that an atomic sequence may contain, the enforced atomicity criteria may include a limit on the number of instructions in the sequence.

Although instructions that meet the atomicity criteria cannot access shared memory directly, they may indirectly access the data in the source cache line via the target register. Thus, instructions that would normally access data in the source cache line may instead read that data from and/or write other data to the target register. Once the core finishes executing the atomic sequence (e.g., encounters a STOP instruction), as indicated by the negative exit from 345, the core may write the computation results stored in the target register back to the source cache line, as in 350, and release the source cache line, as in 355. Thus, the core is able to effectively execute the instructions in the atomic sequence as a single atomic operation.

In some embodiments, the decoder determining whether the instruction meets the atomicity criteria (step 330) may comprise examining an opcode of the instruction to determine whether it indicates an instruction that is known to meet the atomicity criteria. For example, in some embodiments, a decoder in an x86 system may determine that the instruction meets the atomicity criteria if the opcode of the instruction indicates any instruction chosen from the set of: ADD, ADC, AND, XOR, OR, SBB, SUB, CMP, CMOVcc, BT, BTS, BTC, BTR, TEST, and XCHG. In this example, the listed instructions meet the atomicity criteria that none accesses memory or non-general-purpose registers and that none can instruct the processor to transfer program control to a point outside of an atomic sequence (i.e., no jump instruction).

Although steps 330-345 indicate a linear execution of instructions, one of ordinary skill in the art will recognize that various cores may utilize instruction pipelines such that multiple instructions may be executing in 340 concurrently while a subsequent instruction is decoded and/or compared against atomicity criteria in 330. Additionally, the presence of conditionals may cause different instructions in the sequence to be executed multiple times or not at all.

In some embodiments, releasing the source cache line in 355 may include undoing the lock procedure performed in 310, such as by accepting subsequent probes regarding the cache line, re-enabling interrupts, and/or other implementation-specific steps.

In some embodiments, the validation agent may be configured to validate the instruction sequence before execution rather than at runtime (as in FIG. 3). For example, such a validation agent may be implemented in microcode (e.g., microcode 132).

Figure 4:
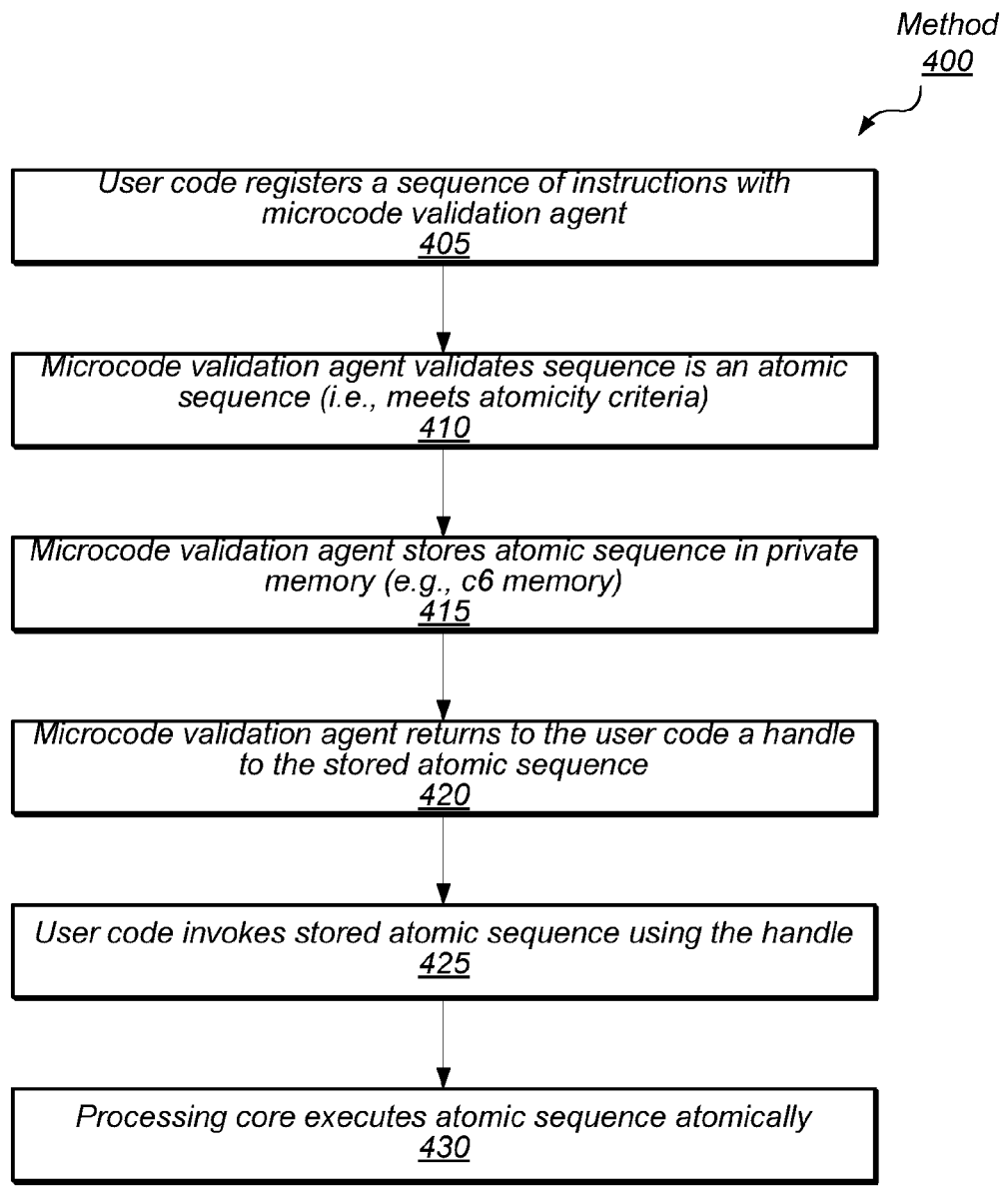
FIG. 4 is a flow diagram illustrating a method of a processing core validating and executing an atomic sequence of instructions using pre-execution validation (e.g., microcoded validation agent), according to some embodiments.

FIG. 4 is a flow diagram illustrating a method of a processing core validating and executing an atomic sequence of instructions using pre-execution validation (e.g., microcoded validation agent), according to some embodiments. In such embodiments, a private memory area (such as 130 of FIG. 1) may store program instructions implementing a validation agent (e.g., 134) configured to validate whether a sequence of instructions is an atomic sequence conforming to one or more atomicity criteria.

According to the illustrated embodiment, method 400 begins in 405, when the user code registers a sequence of program instructions with the validation agent as an atomic sequence. In some embodiments, the user code may register the sequence using a special-purpose instruction (e.g., ATOMICDEF). Such an instruction may include parameters and/or fields that indicate the sequence of instructions.

In response to the attempt to register the sequence of instructions in 405, the microcode validation agent attempts to validate that the sequence of instructions is an atomic sequence, as in 410. As indicated in 410, validating the sequence as atomic may comprise examining each instruction in the sequence and determining that it meets one or more atomicity criteria.

Like the runtime validation agent, the microcode validation agent may check that each instruction in the sequence meets the validation criteria. These criteria may include those enforced by the runtime validation agent (e.g., no instruction in the sequence may access memory or a register other than a GPR). In addition, the microcode validation agent may ensure that each instruction is quick and easy to decode (e.g., each instruction is of limited length, such as 4-bytes, and does not include immediate forms of instructions). Like the hardware-based runtime validation agent, the microcode validation agent may determine that an instruction meets the atomicity criteria in response to detecting that the instruction includes an opcode known to indicate one of a given set of acceptable instructions that meet the atomicity criteria.

If the sequence is an atomic sequence (i.e., meets the atomicity criteria), the validation agent may store the atomic sequence in a private, protected memory area, as in 415. In some embodiments, a core may include a private memory area (such as 130) where the atomic sequence may be stored. Private memory area 130 may include various protected areas (e.g., c6 save area or subset of c6 save area) where the microcode validation agent may store the instruction sequence without the possibility of it being overwritten by another processor. The term protected memory area may refer to those memory areas of a processor that are accessible to microcode but not to software or to other processors.

In 420, the validation agent returns a handle to the invoking user code, as in 420. The handle may comprise a unique identifier for the stored atomic sequence. When the user code needs to execute the atomic sequence, it may invoke the stored atomic sequence using this handle, as in 425. For example, the system may recognize a special instruction for invoking the atomic sequence, as described below.

In response to the user code invoking the stored sequence using the identifying handle (as in 425), the processing core may execute the pre-validated atomic sequence atomically, as in 430. In some embodiments, executing the atomic sequence in 430 may comprise reading a source cache line into a target register, executing the atomic sequence, writing the results in the target register back to the source cache line, and unlocking the source cache line. Since the sequence has already been validated, executing the atomic sequence in 430 may not comprise re-validating the sequence.

Figure 5:
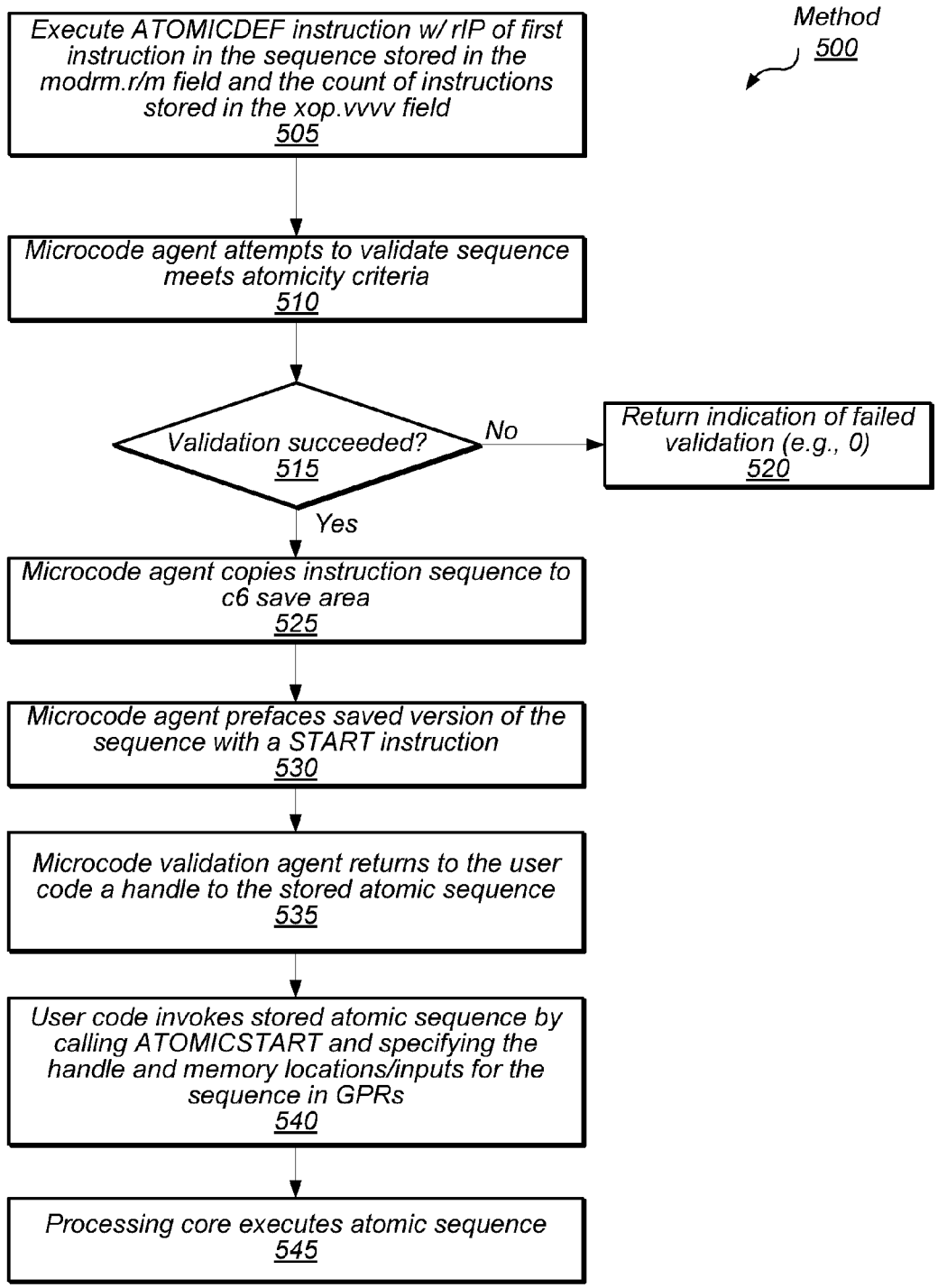
FIG. 5 is a flow diagram illustrating a more detailed method for validating and executing an atomic sequence before runtime using a microcoded validation agent, according to some embodiments.

FIG. 5 is a flow diagram illustrating a more detailed method for validating and executing an atomic sequence before runtime using a microcoded validation agent, according to some embodiments. Method 500 illustrated in FIG. 5 may correspond to a specific implementation of method 400 in FIG. 4 for an x86 architecture. However, in different embodiments, implementation may vary somewhat, including the particular instruction names, instruction fields used to communicate data, particular registers used, etc. It is intended that this disclosure encompass all such embodiments.

According to the illustrated embodiment, to register a sequence of instructions with the microcode validation agent, the user code first executes, e.g., an ATOMICDEF instruction, as in 505. In the illustrated embodiment, the ATOMIC-DEF instruction includes a modrm.r/m field, in which the relative instruction pointer address of the first instruction in the sequence is stored. In addition, the ATOMICDEF instruction in this embodiment includes an xop.vvvv field, which stores a count of (i.e., the number of) instructions in the sequence.

In 510, as part of (or in response to) executing the ATOMICDEF instruction, the microcode validation agent attempts to validate that the instruction sequence identified by the ATOMICDEF (e.g., in the modrm.r/m field) meets the atomicity criteria. As described above, this validation may comprise determining that each of the instructions in the sequence is one of a pre-known acceptable set of instructions that meets the atomicity criteria. In some embodiments, this atomicity criteria may include requirements that (a) no instruction in the sequence may access memory, (b) no instruction in the sequence may access a register that is not a GPR, (c) each instruction is specified using a particular, limited length form, (d) no instruction in the sequence uses an immediate form (an immediate instruction form includes a parameter specified as a number rather than as a register identifier), and/or various other requirements that enable a core to execute the atomic sequence as a single atomic transaction with a guarantee of forward progress.

If one or more instructions in the sequence do not meet the atomicity criteria, the validation fails (as indicated by the negative exit from 515). In some embodiments, the microcode validation agent may signal this failure of the sequence to meet the atomicity criteria by returning an indication of failure to the user code, as in 520, rather than returning a handle to a stored version of the sequence. For example, if the validation fails, the validation agent may return the value 0 to the invoking user code rather than a handle to a stored atomic sequence.

If the validation is successful, as indicated by the affirmative exit from 515, then at sequence indicated by the ATOMICDEF instruction is an atomic sequence that meets the atomicity criteria. In this case, the microcode agent may copy the instruction sequence to a protected memory area, such as the c6 save area in 525, or to another implementation-specific area that ensures software does not rewrite the instructions after an ATOMICDEF instruction is executed, thereby creating the possibility of deadlock.

In some embodiments, the agent may preface the saved version of the instruction sequence with one or more instructions executable to perform a prolog phase for the atomic sequence of instructions. For example, in 530, the agent prefaces the saved instruction sequence with a START instruction. As described above, the START instruction may include respective fields usable to indicate a source cache line and target register for a given atomic execution of the sequence. In such embodiments, the START instruction may be executable to lock the source cache line and to load data from it to the target register.

In 535, the microcode validation agent returns (to the invoking user code) a handle that uniquely identifies the stored atomic sequence. The user code may then use the unique handle to invoke the pre-validated atomic sequence and thereby execute it atomically. For example, in 540, the user code invokes the stored atomic sequence by executing an ATOMICSTART instruction. The ATOMICSTART instruction includes parameters and/or fields specifying the unique handle and the memory locations/inputs for the sequence (e.g., source cache line and target register).

In response to the invocation of 540, the processing core executes the stored atomic sequence atomically, as in 545.

Executing the sequence atomically in 545 may include executing prolog, body, and epilog phases, such as those of method 200 in FIG. 2.

In some embodiments, the basic START functionality described above may be extended to allow an atomic sequence to operate on multiple cache lines. For example, a START2 instruction may be defined to allow a prolog phase of an atomic sequence to lock and load a second source cache line. Thus, an atomic instruction sequence may operate on data from multiple cache lines.

In some embodiments, the prolog of an atomic sequence that accesses multiple cache lines (e.g., using START and START2) may be implemented in a manner that avoids deadlock conditions. For example, in some embodiments, START2 may be executable to read and lock only the cache line that immediately follows the one locked by the preceding START instruction. By doing this, the system avoids deadlock situations in which two threads attempt to lock the same two cache lines in the opposite order, each succeeding in locking a first cache line, but then waiting indefinitely for the other thread to release the other cache line.

In some embodiments, START2 may be used to specify an arbitrary source cache line that need not be the one immediately following the source cache line specified by a preceding START instruction. However, to avoid deadlock, the system may enforce an ordering on the locking. For example, microcode can be used to ensure that a core executing START and START2 locks each of the source cache lines in an order determined by the respective physical memory addresses of those source cache lines (e.g., ascending or descending). By imposing this ordering across all threads, the system can avoid the deadlock situation associated with locking multiple cache lines.

Some atomic sequences may require executing jump instructions. However, a jump instruction may be problematic if it causes program flow to jump outside of the atomic sequence. This may not necessarily cause adverse effects for embodiments with a runtime-validation scheme (e.g., in the decoder) since the runtime validation agent detects any instructions that do not meet the atomicity criteria before they are executed. However, since a pre-runtime validation agent (e.g., microcoded validation agent) checks the atomic sequence in advance, jumping outside of the sequence at runtime may allow instructions that do not meet the atomicity criteria to be executed.

In some embodiments, to avoid jumping outside of a pre-validated atomic instruction sequence, the atomicity criteria may include a stipulation that jump instructions are not permitted. In other embodiments, the criteria may allow jump instructions, but check to ensure that they do not cause execution to jump beyond the atomic sequence.

A microcoded validation agent, as described herein, may also enforce various implementation-specific atomicity criteria in different systems. For example, in some embodiments, the microcoded validation agent may disallow instructions that utilize instruction pointer relative addressing modes. Since invoking a saved atomic sequence may modify the instruction pointer, instructions that include IP-relative parameters may cause unexpected program behavior.

In some embodiments, the atomic sequence validation and/or execution may be performed by an entity other than the core. For example, in some embodiments, the system may include a separate, off-chip atomic program execution unit configured for use by multiple processing cores and/or by other system devices. The off-chip unit may be configured to receive an indication of an atomic sequence from a processing core and/or from another system device and in response, to execute the atomic sequence as a single atomic memory transaction. In such embodiments, the atomic execution unit may validate that an indicated sequence of instructions meets a set of atomicity criteria explicitly or implicitly. For example, the atomic execution unit may implicitly validate a sequence if the unit is able to interpret only those sequences that meet the set of atomicity criteria. Such embodiments are described in more detail below.

Figure 6:
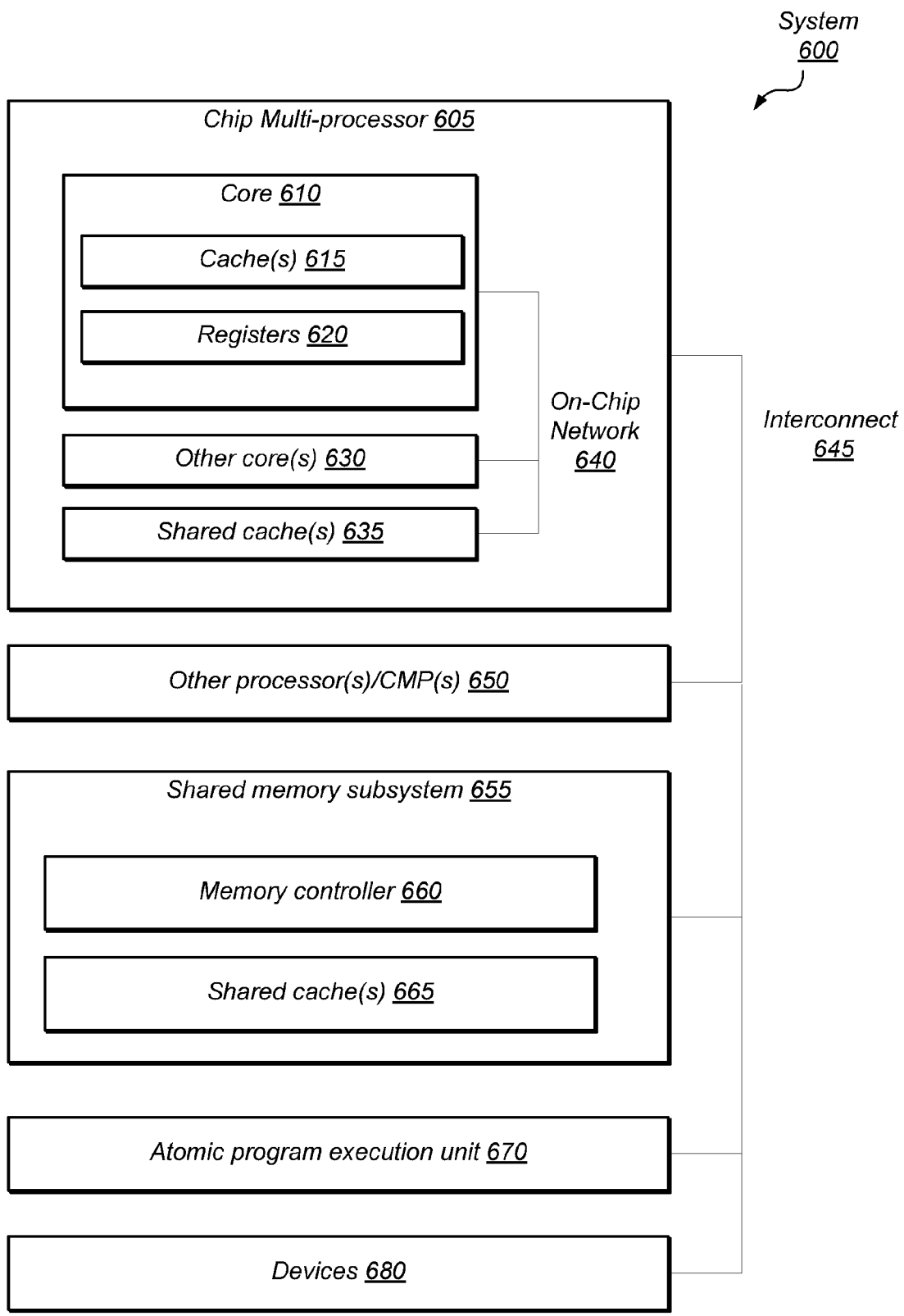
FIG. 6 is a block diagram illustrating a system that includes a special-purpose processor configured to execute atomic sequences of instructions on behalf of one or more processing cores and/or devices, according to some embodiments.

FIG. 6 is a block diagram illustrating a system that includes a special-purpose processor configured to execute atomic sequences of instructions on behalf of one or more processing cores and/or devices, according to some embodiments. In the illustrated embodiment, system 600 includes a chip-multi-processor 605, which includes processing cores 610 and 630. The processing cores are connected to each other and to shared cache 635 by on-chip network 640. Each core itself includes one or more private caches (e.g., 615) and registers (e.g., 620). As described above with relation to FIG. 1, in various embodiments, processing cores in system 600 may be distributed in different arrangements, including on one or more separate chips. For example, system 600 may include one or more other CMPs and/or processors, such as 650.

According to the illustrated embodiment, interconnect 645 connects CMP 605 to other processors/CMPs 650 and a shared memory subsystem 655. The shared memory subsystem 655 may include facilities to store and/or provide access to shared data (i.e., data shared by multiple processing cores in the system). For example, in the illustrated embodiment, shared memory subsystem 655 includes one or more shared caches 665 for storing data and a memory controller 660 for facilitating access by the system's processing cores to that shared data.

In the illustrated embodiment of FIG. 6, system 600 includes atomic program execution unit 670, which may be implemented as a special-purpose processor for executing atomic programs. In various embodiments, atomic program execution unit 670 may be implemented as part of shared memory subsystem 655 and/or placed in different parts of the system as to facilitate fast access to a memory controller (e.g., 660), shared caches (e.g., 665), and/or other components and/or functionality in the shared memory subsystem.

In some embodiments, a processing core (e.g., 610) or peripheral device (e.g., 680) may utilize a special-purpose instruction set (ISA) to encode an atomic program and send the atomic program (or an indication thereof) to the atomic execution unit (e.g., 670) for execution. In some embodiments, the expressiveness of the ISA may be limited such that any valid program encoded using the ISA necessarily meets the set of atomicity criteria. In response to receiving the atomic program or indication thereof, the atomic execution unit may interpret and execute the atomic program as a single atomic memory transaction.

In various embodiments, the atomic program execution unit may be configured for use by one or more processing cores or by peripheral devices, such as devices 680. In various embodiments, devices 680 may include graphics adapters, audio adapters, I/O devices such as disk or optical drives, and/or other devices.

Figure 7:
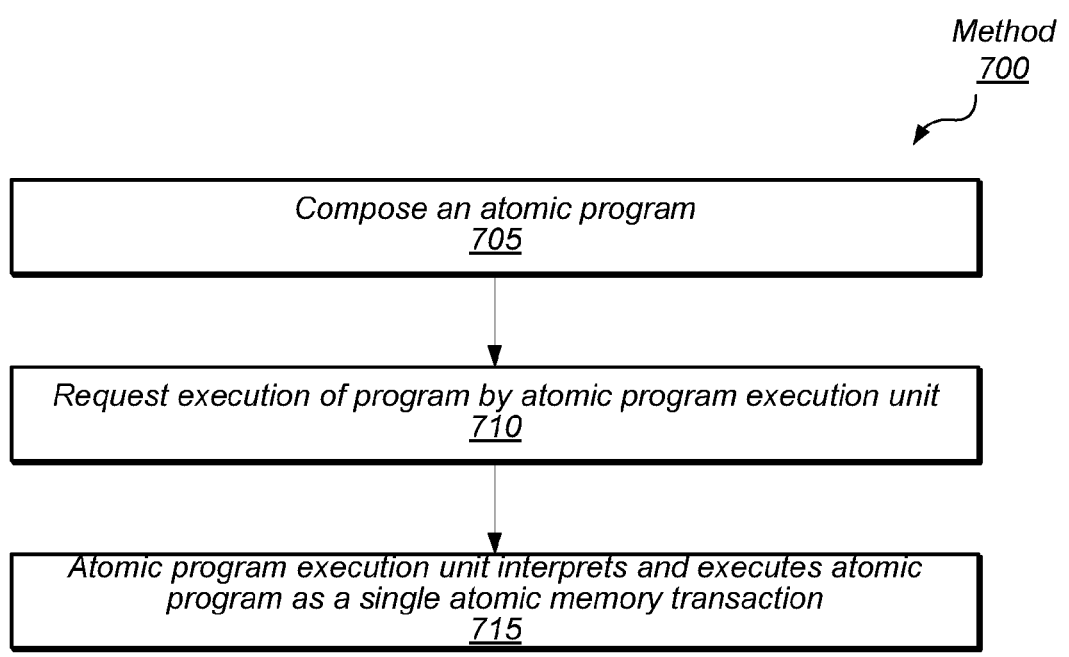
FIG. 7 is a flow diagram illustrating a method for executing an atomic sequence using an atomic program execution unit, according to some embodiments.

FIG. 7 is a flow diagram illustrating a method for executing an atomic sequence using an atomic program execution unit (such as 670), according to some embodiments. In the illustrated embodiment, method 700 begins with a processing core specifying an atomic sequence of instructions using a special-purpose atomic programming language, as in 705. The processing core may specify the atomic sequence of instructions as an atomic program in a single cache line of the processing core (i.e., the source cache line).

In some embodiments, the special-purpose programming language may be designed to implicitly enforce various atomicity criteria that allow the atomic execution unit to execute the sequence with a guarantee of forward progress. For example, in some embodiments, these criteria may include those that no instruction in the atomic sequence instructs the atomic execution unit to access shared memory and/or to jump to an instruction outside of the atomic sequence. By limiting the expressiveness of the atomic programming language to exclude such instructions, the system can guarantee that any valid program composed in step 700 meets these atomicity criteria. Other atomicity criteria may be enforced similarly (e.g., no access to registers other than general purpose registers, etc.)

In some embodiments, the language may be a stack-based language that can be executed in place in the cache line. In place execution refers to a technique of executing a program using no more than the memory space in which the program is specified. For example, a stack-based program stored in a single cache line may be executed in place by popping instructions and/or operands from the stack and pushing results of those instructions and operands back onto the stack such that the stack never outgrows the single cache line. The following instructions define an example stack-based language for encoding an atomic program that meets one or more atomicity criteria, such that an atomic execution unit may execute the atomic program as a single atomic memory transaction:

LOAD ADDR0: loads one word (e.g., 8-bytes) from address 0 and pushes the result
LOAD ADDR1: loads one word from address 1 and pushes the result
STORE ADDR0: pops the top of stack and stores word to address 0 (stores are pending until END)
STORE ADDR1: pops the top of stack and stores word to address 1 (stores are pending until END)
ADD, SUB: Pop2, Add/subtract the values and push the result
DUP: push a copy of top of stack
DUP2: push copies of the top 2 stack elements
SWAP: swap top and second stack elements
END: end program and write out stores
BTn: pop, push value of bit N of popped value
PUSHimm: push immediate #N
CMPSIGNED: Pop2 and push −1, 0, 1 according to sign of difference of signed values popped
CMPUNSIGNED: Pop2 and push −1, 0, 1 according to sign of difference of unsigned values popped
DUP2CMP: Pop2, push popped values back onto stack, and push −1, 0, 1 according to sign of difference of popped values
JE, JG, JL: pop stack and conditionally jump forward N instructions (if new instruction address is outside of cache line, abort the transaction)
J: unconditionally jump forward N instructions (if new instruction address is outside of cache line, abort the transaction)
CMOVE, CMOVG, CMOVL: Pop 3 items from the stack. The top of the stack is used as the condition code: if the condition is true, then push the $2^{nd}$ item on the stack, else push the $3^{rd}$ item
ENDRETURN: Like END but returns the value at the top of the stack cc: conditional "if true"
E: true if top of stack (TOS) is 0
L: true if bottom of stack is 1
G: true if both the top and bottom of the stack are 0

The example instruction set above includes no instructions that access shared memory outside of the cache line where the program is encoded. Furthermore, the instruction set includes no jump instructions that might cause execution to be transferred to a location outside of the program. Therefore, any valid program encoded using the example instruction set meets at least the atomicity criteria forbidding access to shared memory and jumps to locations outside of the atomic sequence.

The stack-based language above is only one example of a possible instruction set for expressing atomic programs. Other variations are possible and may become evident to those skilled in the art given the benefit of this disclosure. For example, in some embodiments, the instruction set may implement a register-to-register language rather than a stack-based language. Other languages and schemes for encoding atomic sequences that meet a set of atomicity criteria guaranteeing atomicity and forward progress are possible.

Once the core composes the atomic program, as in 705, the core may send a request to the atomic execution agent to execute the program, as in 710. In some embodiments, the core may send the encoded atomic program to the execution unit and the execution unit may then store the program in a line of a local cache. In other embodiments, the core may send an address or other indication usable by the execution unit to locate the atomic program.

In some embodiments, a processing core may communicate the atomic program to an atomic execution unit via memory mapping (e.g., as in MMIO) or port mapping (e.g., as in PMIO). For example, using memory mapping, a processing core may use the same address bus to address both memory and the atomic execution unit. In such embodiments, areas of the core's addressable memory space may be temporarily or permanently reserved for the memory mapped atomic unit. The core may then compose atomic programs in the mapped memory area and subsequently notify the atomic execution unit when such programs are ready for execution. In response to such an indication, the execution unit may read and execute the program as a single atomic memory transaction, as in 715. In some embodiments, the memory mapped execution unit may be configured to monitor the processor's address bus for modifications to the assigned address space and thus detect when new atomic programs are ready for execution without explicit notification.

As shown in the illustrated embodiment, after receiving the atomic program, the atomic program execution unit may interpret and execute the program as a single atomic transaction, as in 715. In some embodiments, such as those using the stack-based program encoding, executing the atomic program may include locking the local cache line in which the atomic program is stored, executing the program in place, and unlocking the cache line. Thus, the program execution unit may execute the encoded program atomically in 715. In this example, since the atomic program execution unit executes a program all within a single locked cache line, the unit may avoid deadlock situations.

In various embodiments, devices other than a processing core (e.g., audio/video cards, other peripheral devices, etc.) may utilize the atomic program execution unit as in method 700. For example, such a device may compose an atomic program and (as in 705) and request execution (as in 710) of that program.

In some embodiments, some code (e.g., an operating system) may compose and store one or more atomic programs in protected memory (705) and later use an indentifying handle to invoke the atomic execution unit (710) to execute the corresponding program (715). Thus, an operating system may create a set of one or more trusted atomic programs for later invocation by the kernel.

Figure 8:
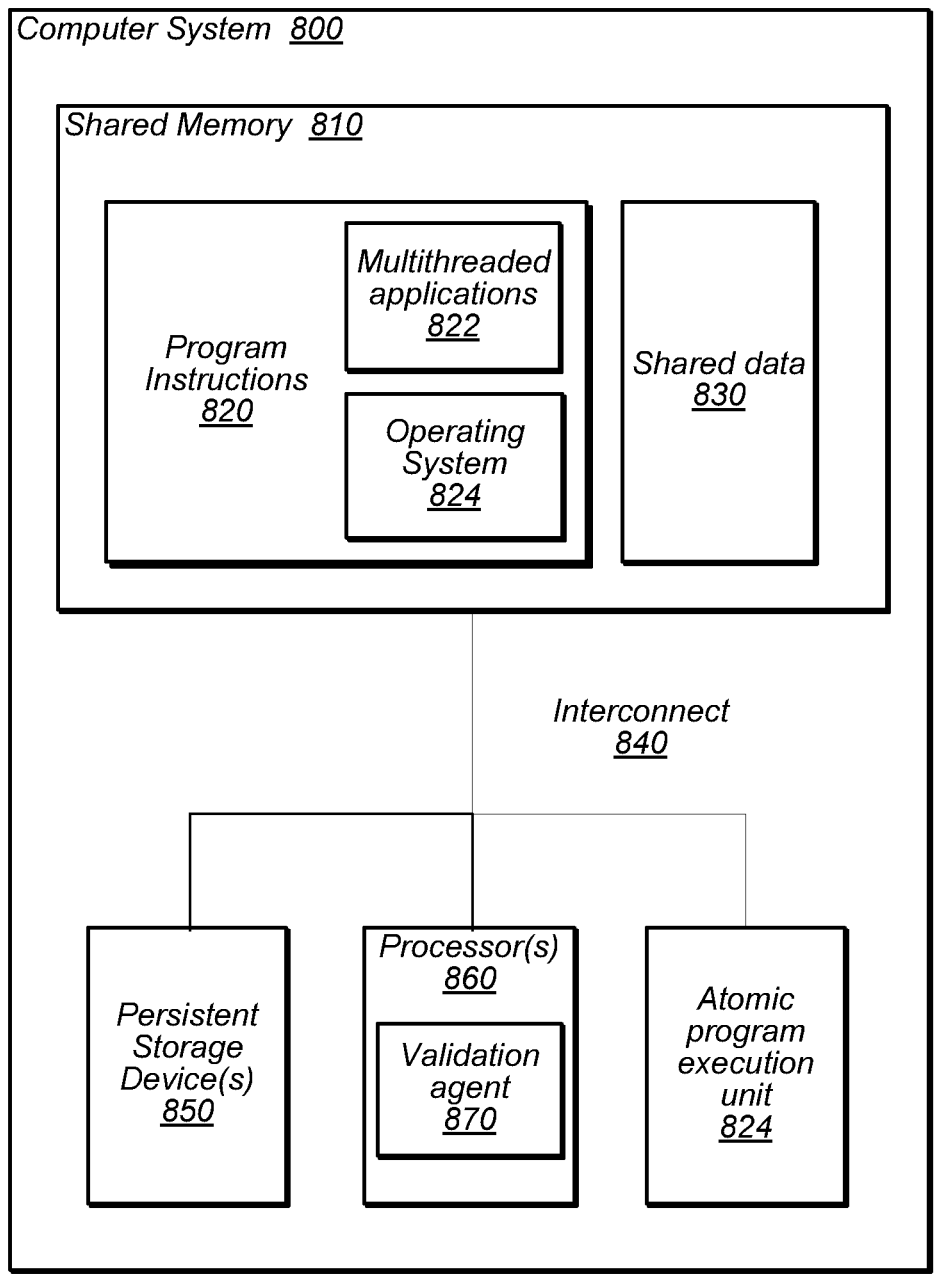
FIG. 8 is a block diagram illustrating a computer system configured to execute an atomic sequence of instructions as a single atomic transaction using code validation agent, according to some embodiments, as described herein.

FIG. 8 is a block diagram illustrating a computer system configured to execute an atomic sequence of instructions as a single atomic transaction using code validation agent, according to some embodiments, as described herein. In some embodiments, computer system 800 may correspond to computer system 190 of FIG. 1.

The computer system 800 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Computer system 800 may include one or more processors 860, any of which may include multiple physical and/or logical cores. Processors 860 may include respective mechanisms to validate that custom atomic sequences meet certain atomicity criteria as described herein, such as validation agent 870. In different embodiments, validation agent 870 may be correspond to a hardware-implemented, runtime validation agent (e.g., in a decoder) or as a micro-coded pre-runtime validation agent, as described herein.

Computer system 800 may also include one or more persistent storage devices 850 (e.g. optical storage, magnetic storage, hard drive, tape drive, solid state memory, etc), which may persistently store data.

In some embodiments, system 800 may include a special-purpose processor for executing atomic sequences of instructions, such as atomic program execution unit 824. Although FIG. 8 illustrates both an out-of-core atomic program execution unit 824 and a validation agent 870, other embodiments may include only one or the other of these components.

According to the illustrated embodiment, computer system 800 may include one or more shared memories 810 (e.g., one or more of cache, SRAM, DRAM, RDRAM, EDO RAM, DDR 10 RAM, SDRAM, Rambus RAM, EEPROM, etc.), which may be shared between multiple processing cores, such as on one or more of processors 860. The one or more processors 860, the storage device(s) 850, the atomic program execution unit 824, and shared memory 810 may be coupled via interconnect 840. In various embodiments, the system may include fewer or additional components not illustrated in FIG. 8 (e.g., video cards, audio cards, additional network interfaces, peripheral devices, a network interface such as an ATM interface, an Ethernet interface, a Frame Relay interface, monitors, keyboards, speakers, etc.). Additionally, different components illustrated in FIG. 8 may be combined or separated further into additional components.

In some embodiments, shared memory 810 may store program instructions 820, which may be encoded in platform native binary, any interpreted language such as Java™ bytecode, or in any other language such as C/C++, Java™, etc or in any combination thereof. Program instructions 820 may include program instructions to implement one or more multi-threaded applications 822, which require synchronization mechanisms and may include atomic instruction sequences, as described herein. In some embodiments, program instructions 820 may also include instructions executable to implement an operating system 824 that provides software support for executing applications 822 (e.g., scheduling, software signal handling, etc.).

According to the illustrated embodiment, shared memory 810 may include shared data 830, which may be accessed by multiple ones of processors 860 and/or processing cores thereof. Ones of processors 860 may cache various components of shared data 830 in local caches, and coordinate the data in these caches by exchanging messages according to a cache coherence protocol, as described herein.

Program instructions 820, such as those used to implement multithreaded applications 822 and/or operating system 824, may be stored on a computer-readable storage medium. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions.

A computer-readable storage medium as described above may be used in some embodiments to store instructions read by a program and used, directly or indirectly, to fabricate hardware comprising one or more of processors 860. For example, the instructions may describe one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of processor 500. The netlist may then be placed and routed to produce a data set describing geometric shapes to be applied to masks. The masks may then be used in various semiconductor fabrication steps to produce a semiconductor circuit or circuits corresponding to processors 100, 605, and/or 860. Alternatively, the database may be the netlist (with or without the synthesis library) or the data set, as desired.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed:

1. An apparatus comprising:
    a processing core in a multi-processing core system, the processing core being configured to:
        assemble an atomic program; and
        store the atomic program in a cache line;
        wherein the processing core is configured to verify that:
            each instruction in the atomic program accesses only data that was stored in the cache line before execution of the atomic program; and
    an atomic program execution unit configured to execute the stored atomic program as a single atomic memory transaction with a guarantee of forward progress.

2. The apparatus of claim 1, wherein the atomic program includes at least one branch instruction.

3. The apparatus of claim 1, wherein the atomic program is specified using a stack-based language and wherein the atomic program is executed in place in the cache line.

4. The apparatus of claim 3, wherein every instruction expressible by the stack-based language meets a set of one or more atomicity criteria, including that executing the instruction does not require accessing shared memory.

5. The apparatus of claim 1, wherein executing the atomic program comprises locking the cache line, executing a sequence of instructions specified by the atomic program, and unlocking the cache line.

6. The apparatus of claim 1, wherein the atomic program execution unit is configured to execute atomic programs for multiple processing cores.

7. The apparatus of claim 1, further comprising:
a peripheral device configured to store another atomic program in a cache line of the peripheral device, wherein the atomic program execution unit is separate from the peripheral device and is configured to execute the another atomic program as a single atomic memory transaction with a guarantee of forward progress.

8. The apparatus of claim 1, wherein the atomic program execution unit executes the atomic program in response to receiving a request from the processing core.

9. The apparatus of claim 8 wherein the apparatus is configured to associate the stored atomic program with a handle identifier; and
wherein the request from the processing core comprises the handle identifier.

10. A method comprising:
a processing core in a multi-processing core system validating that: each instruction in an atomic program accesses only data that was stored in a cache line before execution of the atomic program;
storing the validated atomic program in the cache line; and
an atomic program execution unit executing the stored atomic program as a single atomic memory transaction with a guarantee of forward progress.

11. The method of claim 10, wherein the atomic program comprises a plurality of instructions.

12. The method of claim 10, wherein the atomic program is specified using a stack-based language and wherein the atomic program is executed in place in the cache line.

13. The method of claim 12, wherein every instruction expressible by the stack-based language meets a set of one or more atomicity criteria, including that executing the instruction does not require accessing shared memory.

14. The method of claim 10, wherein executing the atomic program comprises locking the cache line, executing a sequence of instructions specified by the atomic program, and unlocking the cache line.

15. The method of claim 10, wherein the cache line is mapped to a memory space of the atomic program execution unit.

16. The method of claim 10, further comprising:
a peripheral device storing another atomic program in a cache line of the peripheral device, wherein the atomic program execution unit is separate from the peripheral device and is configured to execute the another atomic program as a single atomic memory transaction with a guarantee of forward progress.

17. The method of claim 10, wherein the atomic program execution unit executes the atomic program in response to receiving a request from the processing core.

18. The method of claim 17, further comprising:
associating a the stored atomic program with a handle identifier and wherein the request from the processing core comprises the handle identifier.

19. A non-transitory computer readable storage medium comprising a data structure which is operated upon by a program executable on a computer system, the program operating on the data structure to perform a portion of a process to fabricate an integrated circuit including circuitry described by the data structure, the circuitry described in the data structure including:
a processing core in a multi-processing core system, the processing core being configured to assemble an atomic program and store the atomic program in a cache line, wherein the processing core is configured to verify that: each instruction in the atomic program accesses only data that was stored in the cache line before execution of the atomic program; and
an atomic program execution unit configured to execute the stored atomic program as a single atomic memory transaction with a guarantee of forward progress.

20. The non-transitory computer readable storage medium of claim 19, wherein the storage medium stores at least one of HDL, Verilog, or GDSII data.

* * * * *

UNITED STATES PATENT AND TRADEMARK OFFICE
CERTIFICATE OF CORRECTION

PATENT NO.        : 8,793,471 B2                                    Page 1 of 1
APPLICATION NO.   : 12/961844
DATED             : July 29, 2014
INVENTOR(S)       : Benjamin C. Serebrin et al.

It is certified that error appears in the above-identified patent and that said Letters Patent is hereby corrected as shown below:

In the Claims

Column 17, line 20 (claim 9), delete "claim 8" and insert --claim 8,--.

Column 18, line 19 (claim 18), delete "associating a the stored" and insert --associating a stored--.

Signed and Sealed this
Seventh Day of October, 2014

Michelle K. Lee
*Deputy Director of the United States Patent and Trademark Office*